(12) United States Patent
Diep et al.

(10) Patent No.: US 8,550,256 B1
(45) Date of Patent: Oct. 8, 2013

(54) FILTRATION MEMBRANE WITH COVALENTLY GRAFTED FOULING-RESISTANT POLYMER

(75) Inventors: Jacquana T. Diep, San Jose, CA (US); Young-Hye Na, San Jose, CA (US); Ankit Vora, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/560,769

(22) Filed: Jul. 27, 2012

(51) Int. Cl.
*B01D 39/00* (2006.01)
*B01D 29/00* (2006.01)
*B01D 67/00* (2006.01)

(52) U.S. Cl.
USPC .............. 210/500.21; 210/500.1; 210/500.27; 210/500.41; 210/500.38; 210/500.29; 210/500.28; 210/500.4; 210/490; 264/48; 427/244; 427/245; 427/246; 521/27; 521/63

(58) Field of Classification Search
None
See application file for complete search history.

(56) References Cited

U.S. PATENT DOCUMENTS 5,178,766 A   1/1993   Ikeda et al.
5,853,744 A   12/1998  Mooradian et al.
(Continued)

OTHER PUBLICATIONS

Helin et al., "Anti-fouling ultrafiltration membrane prepared from polysulfone-graft-methyl acrylate copolymers by UV-induced grafting method," Journal of Environmental Sciences 20 (2008): 565-570.

(Continued)

*Primary Examiner* — Ana Fortuna
*Assistant Examiner* — Benjamin J Behrendt

(74) *Attorney, Agent, or Firm* — Shumaker & Sieffert, P.A.

(57) ABSTRACT

A method of photo-grafting onto a separation membrane a copolymer includes at least one of:

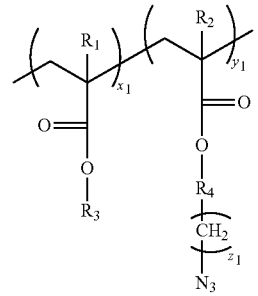

Structure 1A and;

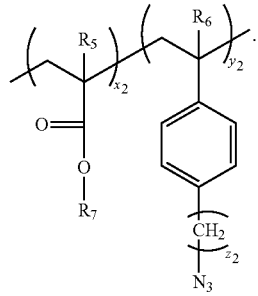

Structure 1B

For example, in Structure 1A, $x_1 \geq 2$ and $y_1 \geq 1$; $R_1$ and $R_2$ are independently selected from the group consisting of $CH_3$ and H; $R_3$ is independently selected from the group consisting of poly(oxyalkylene), quaternary ammonium salts, pyridinium salts, sulfonium salts, sulfobetaines, carboxybetaines, alcohols, phenols, tertiary amines, aryl groups; linear, branched and cyclic alkylenes; linear, branched and cyclic heteroalkylenes; linear, branched and cyclic fluoroalkylenes; and siloxyl; $R_4$ is independently selected from the group consisting of linear, branched, and cyclic alkylenes; linear, branched and cyclic hetroalkylenes; linear, branched and cyclic fluoroalkylenes; phenyl; and siloxyl; and $Z_1$ is 0 or 1.

15 Claims, 4 Drawing Sheets

(56) References Cited

U.S. PATENT DOCUMENTS

| | | |
|---|---|---|
| 7,034,129 B2 | 4/2006 | Moloney et al. |
| 7,897,797 B2 | 3/2011 | Emrick et al. |
| 7,989,619 B2 | 8/2011 | Guire et al. |
| 2008/0142454 A1 | 6/2008 | Emrick et al. |
| 2010/0104858 A1 | 4/2010 | Horio et al. |

OTHER PUBLICATIONS

Lequieu et al., "Track etched membranes with thermo-adjustable porosity and separation properties by surface immobilization of poly(N-vinylcaprolactam)," Journal of Membrane Science 256 (2005): 64-71.

Park et al., "Permeation Control through Porous Membranes Immobilized with Thermosensitive Polymer," Langmuir 1998, 14, 910-914.

Revanur et al., "Reactive Amphiphilic Graft Copolymer Coatings Applied to Poly(vinylidene flouride) Ultrafiltration Membranes," Macromolecules 2007, 40, 3624-3630.

Thom et al., "Synthesis of photoreactive a-4-azidobenzoyl-w-methoxypoly(ethylene glycol)s and their end-on photo grafting onto polysulfone ultrafiltration membranes," Macromol. Chem. Phys. 199, 2723-2729, 1998.

FILTRATION MEMBRANE WITH COVALENTLY GRAFTED FOULING-RESISTANT POLYMER

BACKGROUND

Membranes used in filtration processes commonly experience substantial flux declines when exposed to feed water contaminants such as, for example, particulates or suspensions of organic, inorganic or biological materials. The contaminants can cause membrane fouling, which increases the operating pressure required for a constant rate of water production, decreases the service lifetime of the membrane, and increases operating costs. To reduce fouling, the feed water entering the membrane may be pre-treated, or the membrane may be periodically chemically cleaned to remove contaminant deposits. Although pretreatment processes can remove certain foulants such as large particles or biomolecules, dissolved organic matter can remain on the membrane following the pretreatment step.

To improve fouling resistance, a fouling-resistant polymer may be grafted onto the membrane surface. This grafting process has proven in some cases to be difficult, particularly when a membrane is to be utilized in an application where both fouling resistance and antimicrobial properties are desired. Some membrane-modifying polymers are not water soluble and/or can be difficult to synthesize, while others do not form a crosslinked network, which results in a surface grafting density that is very low.

SUMMARY

The present disclosure is directed to polymers and a photografting method of bonding these polymers onto a surface of a membrane active layer to yield a filtration membrane with enhanced fouling resistance and antimicrobial properties. More particularly, the present disclosure is directed to a method of modifying a surface of a membrane by covalently grafting thereon a fouling-resistant and antimicrobial poly(meth)acrylate copolymer, and the membranes produced by this method.

In one aspect, the present disclosure is directed to a method of photo-grafting onto a surface of a membrane a copolymer selected from the group consisting of:

(A)

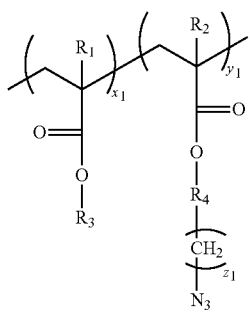

Structure 1A wherein, in Structure 1A:
$x_1 \geq 2$ and $y_1 \geq 1$;
$R_1$ and $R_2$ are independently selected from the group consisting of $CH_3$ and H;
$R_3$ is independently selected from the group consisting of poly(oxyalkylene), quaternary ammonium salts, pyridinium salts, sulfonium salts, sulfobetaines, carboxybetaines, alcohols, phenols, tertiary amines, aryl groups; linear, branched and cyclic alkylenes; linear, branched and cyclic heteroalkylenes; linear, branched and cyclic fluoroalkylenes; and siloxyl;

$R_4$ is independently selected from the group consisting of linear, branched, and cyclic alkylenes; linear, branched and cyclic hetroalkylenes; linear, branched and cyclic fluoroalkylenes; phenyl; and siloxyl; and
$Z_1$ is 0 or 1;
and;
(B)

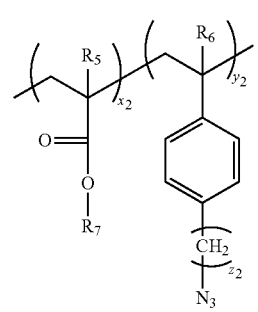

Structure 1B wherein, in Structure 1B:
$X_2 \geq 2$ and $y_2 \geq 1$;
$R_5$ and $R_6$ are independently selected from the group consisting of $CH_3$ and H;
$R_7$ is independently selected from the group consisting of poly(oxyalkylene), quaternary ammonium salts, pyridinium salts, sulfonium salts, sulfobetaines, carboxybetaines, alcohols, phenols, tertiary amines, aryl groups; linear, branched and cyclic alkylenes; linear, branched and cyclic heteroalkylenes; linear, branched and cyclic fluoroalkylenes; and siloxyl; and
$Z_2$ is 0 or 1.

In another embodiment, the present disclosure is directed to a method, including:
(a) applying to a surface of a membrane an aqueous solution including a copolymer selected from the group consisting of:
(A)

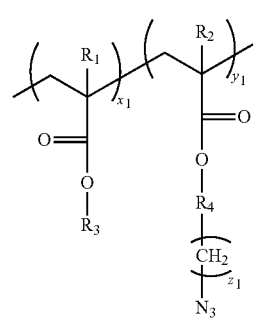

Structure 1A wherein, in Structure 1A:
$x_1 \geq 2$ and $y_1 \geq 1$;
$R_1$ and $R_2$ are independently selected from the group consisting of $CH_3$ and H;
$R_3$ is independently selected from the group consisting of poly(oxyalkylene), quaternary ammonium salts, pyridinium salts, sulfonium salts, sulfobetaines, carboxybetaines, alcohols, phenols, tertiary amines, aryl groups; linear, branched and cyclic alkylenes; linear, branched and cyclic heteroalkylenes; linear, branched and cyclic fluoroalkylenes; and siloxyl;

$R_4$ is independently selected from the group consisting of linear, branched, and cyclic alkylenes; linear, branched and cyclic hetroalkylenes; linear, branched and cyclic fluoroalkylenes; phenyl; and siloxyl; and $Z_1$ is 0 or 1;
and;
(B)

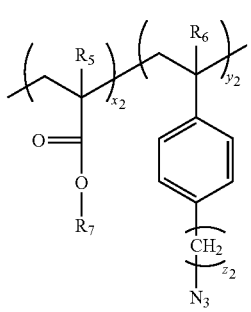

Structure 1B wherein, in Structure 1B:

$X_2 \geq 2$ and $y_2 \geq 1$;

$R_5$ and $R_6$ are independently selected from the group consisting of $CH_3$ and H;

$R_7$ is independently selected from the group consisting of poly(oxyalkylene), quaternary ammonium salts, pyridinium salts, sulfonium salts, sulfobetaines, carboxybetaines, alcohols, phenols, tertiary amines, aryl groups; linear, branched and cyclic alkylenes; linear, branched and cyclic heteroalkylenes; linear, branched and cyclic fluoroalkylenes; and siloxyl; and $Z_2$ is 0 or 1; and (b) exposing the surface of the membrane to an actinic light source to graft at least one of the copolymers to the surface of the membrane.

In yet another embodiment, the present disclosure is directed to a membrane including a support layer; and an active layer over the support layer, wherein the active layer includes a surface having covalently bound thereto a poly (meth)acrylate copolymer including repeat units selected from the group consisting of:

(A)

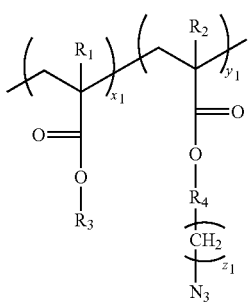

Structure 1A wherein, in Structure 1A:

$x_1 \geq 2$ and $y_1 \geq 1$;

$R_1$ and $R_2$ are independently selected from the group consisting of $CH_3$ and H;

$R_3$ is independently selected from the group consisting of poly(oxyalkylene), quaternary ammonium salts, pyridinium salts, sulfonium salts, sulfobetaines, carboxybetaines, alcohols, phenols, tertiary amines, aryl groups; linear, branched and cyclic alkylenes; linear, branched and cyclic heteroalkylenes; linear, branched and cyclic fluoroalkylenes; and siloxyl;

$R_4$ is independently selected from the group consisting of linear, branched, and cyclic alkylenes; linear, branched and cyclic hetroalkylenes; linear, branched and cyclic fluoroalkylenes; phenyl; and siloxyl; and $Z_1$ is 0 or 1;
and;
(B)

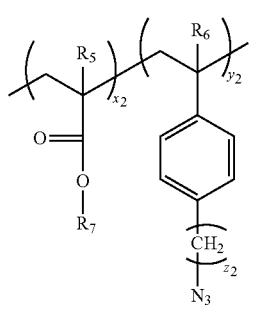

Structure 1B wherein, in Structure 1B:

$X_2 \geq 2$ and $y_2 \geq 1$;

$R_5$ and $R_6$ are independently selected from the group consisting of $CH_3$ and H;

$R_7$ is independently selected from the group consisting of poly(oxyalkylene), quaternary ammonium salts, pyridinium salts, sulfonium salts, sulfobetaines, carboxybetaines, alcohols, phenols, tertiary amines, aryl groups; linear, branched and cyclic alkylenes; linear, branched and cyclic heteroalkylenes; linear, branched and cyclic fluoroalkylenes; and siloxyl; and $Z_2$ is 0 or 1.

The modification of the surface of the membrane by the photografting technique described herein makes the modified membrane surface more hydrophilic and more resistant to organic and bio fouling. The membrane modified with the grafted copolymer is also expected to have enhanced antimicrobial efficacy.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

In the drawings, like symbols indicate like elements.

DETAILED DESCRIPTION

Figure 1:
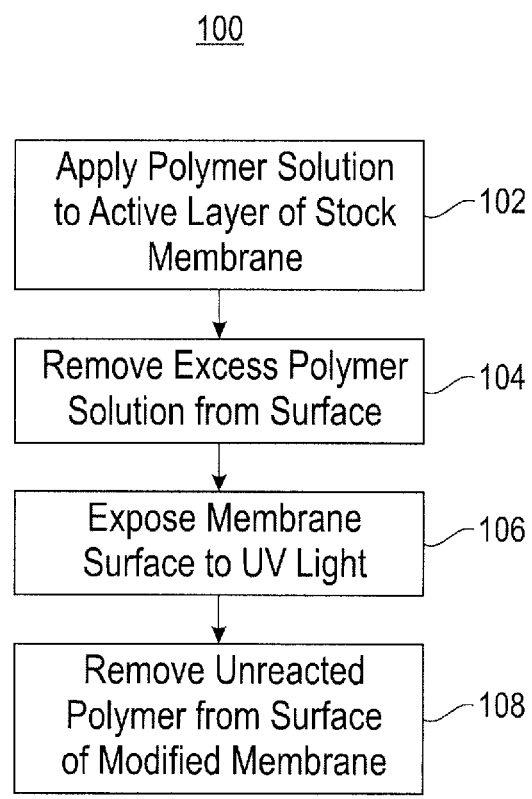
FIG. 1 is a flow chart of a method for making a surface-modified membrane using a photografting technique.

FIG. 1 is a flow chart directed to a method 100 for making a surface-modified membrane using a photografting technique. In step 102, a polymer solution is applied to a surface of an active layer of a stock filtration membrane. Any filtration membrane may be used, but in some embodiments the membrane is an ultrafiltration (UF) or a microfiltration (MF) membrane.

The active layer of the stock membrane can vary widely depending on the intended application, can be flexible or rigid, and can include an organic material, an inorganic material, a metal material, or a combination of the foregoing materials. Exemplary organic materials for the active layer of the stock membrane include cellulose acetates, cellulose nitrates, regenerated celluloses, polysulfones, polyethersulfones, polypiperazine amides (such as those available under the trade designation FILMTEC from Dow Chemical, Midland, Mich.), polyacrylonitriles and copolymers, track-etched polyesters (e.g., those sold under the trade designation CYCLOPORE by Whatman Ltd), polycarbonates (e.g., those sold under the trade designation NUCLEPORE by Whatman Ltd), poly(vinylidene difluoride), polypropylenes, Nylon 6,6, poly(tetrafluoroethylene)s (e.g., those sold under the trade names PORO-TEX and PARA-TEL by DeWAL Industries), and combinations of the foregoing materials. Exemplary inorganic materials for the active layer of the stock membrane include nanoporous alumina ($Al_2O_3$) (e.g., those sold under the trade name ANOPORE by Whatman Ltd.), beryllia (BeO), titania ($TiO_2$), zirconia ($ZrO_2$), silica ($SiO_2$), magnesia (MgO), calcia (CaO), yttria ($Y_2O_3$), strontia (SrO), lanthana ($La_2O_3$), hafnia ($HfO_2$), oxides of iron, manganese oxide (MnO), carbides, nitrides, silicides, and combinations of the foregoing materials. Exemplary metals that may be included in the active layer of the stock membranes include, for example, nickel, nickel alloys, and stainless steel.

The active layer of the stock membrane has an average pore diameter of about 1 to about 1000 nm, about 1 to 100 nm (0.1 micrometer), about 1 to 10 nm, about 2 to about 8 nm, and even more particularly about 3 to about 6 nm. In this application the term "pores" refers to regular and irregular voids and/or channels extending from one face to an opposite face of the porous support membrane. Microfiltration (MF) stock membranes have an average pore size of about 0.1 micrometers and a molecular weight cutoff of about 500,000 Daltons. Ultrafiltration (UF) stock membranes have an average pore size of about 0.01 micrometers to about 0.1 micrometers and a molecular weight cutoff of about 1,000 Daltons to 500,000 Daltons. The pore size of poly(sulfone) (PSF) ultrafiltration stock membrane used in the examples below is about 1 to about 10 nm.

The porous stock membrane can have a thickness of 1 micrometer to 10 millimeters, more particularly 1 micrometer to 100 micrometers, more particularly 1 micrometer to 80 micrometers, and even more particularly 1 micrometer to 50 micrometers.

In some embodiments, the active layer of the stock membrane can optionally be underlain by a support layer, which may be, for example, another membrane, a woven or a non-woven fibrous material, a polymeric film or a paper layer.

The polymer solution applied to the surface of the active layer of the stock membrane includes an azido-functional poly(meth)acrylate copolymer. The copolymer is water-compatible and provides fouling resistance when grafted onto the active layer of the stock membrane.

The poly(meth)acrylate copolymer is water-compatible, which means soluble in water or suitably dispersible in water. The poly(meth)acrylate copolymer includes a monomeric repeat unit having at least one side chain group with an azido ($N_3$) group. The term "(meth)acrylate" refers to an acrylate or a methacrylate monomer. The term "poly(meth)acrylate" refers to a polymer in which the majority of the repeat units are derived from one or more acrylate monomers, one or more methacrylate monomers, or combinations thereof.

The poly(meth)acrylate copolymer can be a random copolymer or a block copolymer. The block copolymer can include a block with a homopolymer chain segment or a random copolymer chain segment. In some embodiments, the number average molecular weight Mn of the poly(meth)acrylate copolymer can be 1000 to 1,000,000 g/mol, more particularly 1000 to 100,000 g/mol, and even more particularly 1000 to 50,000 g/mole.

In one embodiment, the azido-functional poly(meth)acrylate copolymer includes repeat units represented by Formula 1A below:

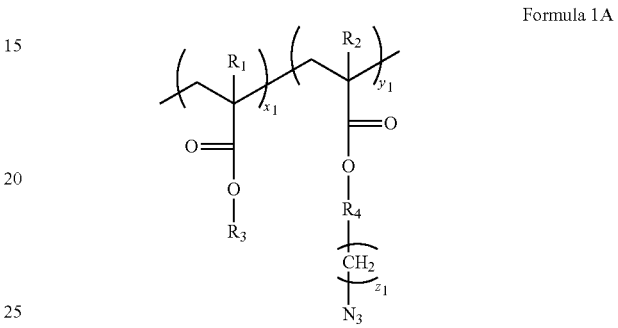

Formula 1A

In Formula 1:

$x_1 \geq 2$ and $y_1 \geq 1$;

$R_1$ and $R_2$ are independently selected from the group consisting of $CH_3$ and H;

$R_3$ is independently selected from the group consisting of poly(oxyalkylene), quaternary ammonium salts, pyridinium salts, sulfonium salts, sulfobetaines, carboxybetaines, alcohols, phenols, tertiary amines, aryl groups; linear, branched and cyclic alkylenes; linear, branched and cyclic heteroalkylenes; linear, branched and cyclic fluoroalkylenes; and siloxyl;

$R_4$ is independently selected from the group consisting of linear, branched, and cyclic alkylenes; linear, branched and cyclic hetroalkylenes; linear, branched and cyclic fluoroalkylenes, phenyl and siloxyl; and $Z_1$ is 0 or 1.

In another embodiment, the azido-functional, poly(meth) acrylate copolymer includes repeat units represented by Formula 1B below:

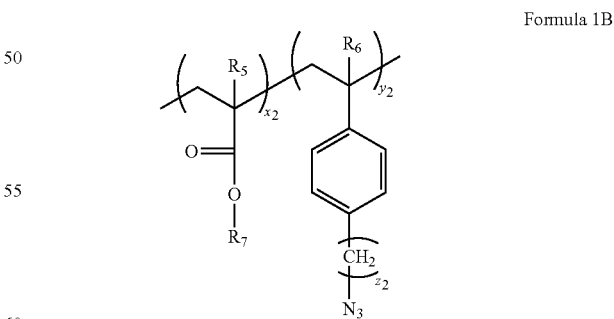

Formula 1B

In Formula 1B:

$X_2 \geq 2$ and $y_2 \geq 1$;

$R_5$ and $R_6$ are independently selected from the group consisting of $CH_3$ and H;

$R_7$ is independently selected from the group consisting of poly(oxyalkylene), quaternary ammonium salts, pyridinium salts, sulfonium salts, sulfobetaines, carboxybetaines, alcohols, phenols, tertiary amines, aryl groups; linear, branched and cyclic alkylenes; linear, branched and cyclic heteroalkylenes; linear, branched and cyclic fluoroalkylenes; and siloxyl; and $Z_2$ is 0 or 1.

The molar ratios of the monomeric units in Formulas 1A and 1B can vary widely depending on the intended application, but in some embodiments the azide moieties (the monomeric units including the azido group) should make up about 0.5 mol % to about 20 mol % of the copolymer, and in other embodiments the azide moieties should make up about 1 mol % to about 10 mol % of the copolymer.

In one embodiment, the copolymer of Formula 1A includes repeat units represented by Formula 3 below, with the subscripts representing relative moles:

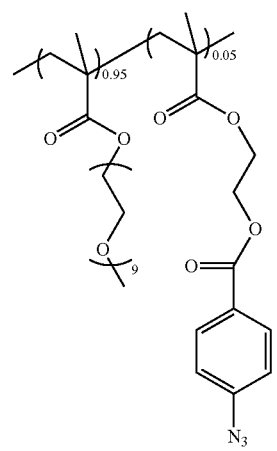

Formula 3

In another embodiment, the copolymer of Formula 1B includes repeat units represented by Formula 4 below, with the subscripts representing relative moles:

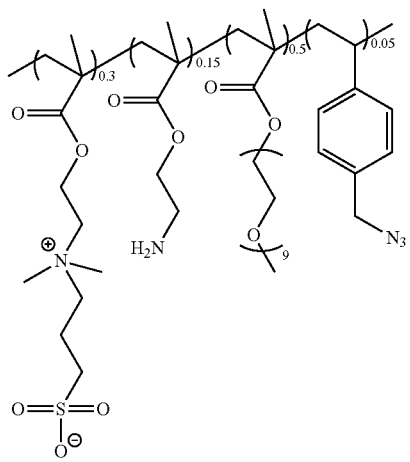

Formula 4

In another embodiment, the copolymer of Formula 1B includes repeat units represented by Formula 5 below, with the subscripts representing relative moles:

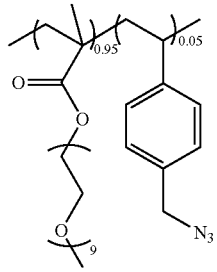

Formula 5

The azido-functional poly(meth)acrylate copolymers described above can be prepared using various known methods and conditions for the polymerization of vinyl monomers, in particular (meth)acrylate monomers, including but not limited to solution polymerization, suspension polymerization, and emulsion polymerization. The monomers can be polymerized batch-wise to form a random copolymer, or sequentially to generate block copolymers. In particular, the copolymer is formed by free radical polymerization, initiated by organic peroxides, azo compounds, persulfates, photoinitiators, and ionized radiation such as γ-rays. The polymerization is conducted at a temperature of 20° C. to 100° C., more particularly 40° C. to 90° C.

The azido-functional poly(meth)acrylate copolymers described above may be diluted with deionized water and applied to a surface of the stock membrane as an aqueous coating solution.

Optionally, a phase transfer catalyst or surfactant or other additives can be added to the aqueous coating solution to enhance reactivity or to improve membrane performance. The concentration of the copolymers in the aqueous coating solution can vary widely depending on the intended application. For example, the concentration of the copolymers in the aqueous coating solution can range from 0.01% (w/v) to 20% (w/v), or 0.5% to 10% (w/v), or 1% to 5% (w/v).

The aqueous coating solution including the azido-functional poly(meth)acrylate copolymers described above may be applied to the surface of the stock membrane in a variety of ways, including spraying the solution onto the membrane surface, brushing the solution onto the membrane surface, or dipping the stock membrane in the coating solution. Application of the coating solution to the membrane surface may be conducted at any suitable temperature, and room temperature has been found to provide excellent results. Referring again to FIG. 1, in step 104 excess coating solution is optionally removed from the surface of the stock membrane prior to subsequent treatment steps. The excess solution may be removed, for example, with a rubber roller.

Referring again to FIG. 1, in step 106 UV light from an actinic light source is applied to the surface of the stock membrane that is wet with the coating solution including the azido-functional poly(meth)acrylate copolymers described above. Depending on the copolymers employed, an appropriate wavelength of UV light may be selected, and wavelengths of about 254 nm, 310 nm, and/or 365 nm have been found to be useful to cause the copolymers to react and covalently bind to the surface of the stock membrane. The UV light may be generated by any suitable apparatus, and a UV bulb has been found to work well. An appropriate exposure time may be selected to ensure a substantially complete reaction, and exposure times of about 1 minute to about 10 minutes, or about 2 minutes to about 5 minutes, have been found to provide excellent results.

While not wishing to be bound by any particular theory, presently available evidence indicates that upon exposure to UV light, the azido-functional component on the copolymer backbone photo-decomposes to generate nitrene with release of nitrogen. The resulting nitrene radicals react with the compounds on the surface of the stock membrane, enabling covalent grafting of the polymer on the stock membrane's active layer.

Referring again to FIG. 1, step 108, when the reaction between the copolymer is substantially complete, the modified stock membrane may be treated to remove un-grafted copolymer from the surface. The unreacted, un-grafted polymer may be removed by soaking the modified stock membrane in deionized water for a sufficient time, typically approximately 24 hours.

The surface of the resulting modified membrane can include a wide variety of structures, as the azide groups on the copolymer can bond with the stock membrane material itself (such as, for example, polysulfone). In addition to reacting with the surface of the stock membrane, the azide groups on the copolymer can also react with the other functional groups on the copolymer itself to form a crosslinked structure. A water-compatible azido-functional poly(meth)acrylate copolymer with repeat units such as those shown in Formulae 1A-1B is photografted (covalently bonded) to the surface of the active layer of the modified membrane. These copolymer chains also react with one another to form a crosslinked network over the active layer surface.

The modification of the active layer of the stock membrane by the photografting technique described above makes the modified membrane surface more hydrophilic and more resistant to organic and bio fouling. The membrane modified with the grafted copolymer is also expected to have enhanced antimicrobial efficacy.

The following non-limiting examples illustrate the practice of the invention.

EXAMPLES

Materials referenced in the following examples are listed in Table 1.

TABLE 1

| NAME | DESCRIPTION | SUPPLIER |
| --- | --- | --- |
| AEMA-HCl | 2-Aminoethyl Methacrylate Hydrochloride Salt | Aldrich |
| SBMA | Sulfobetaine Methacrylate | Aldrich |
| AMPA-2HCl | Azobis(2-Methypropion-Amidine) Dihydrochloride; initiator | Aldrich |
| MPEGMA | Poly(Ethylene Glycol) Methyl Ether Methacrylate (Mn = 475 G/Mol) | Aldrich |
| PSF | Polysulfone membrane, Model Number PS20 for ultrafiltration, Performance properties: water flux 900 (LMH/bar), Marker = 20K Dalton poly(ethylene glycol), % Marker Rejection = 95% at 30 psi/25° C./2000 ppm Marker | Sepro Membranes |

Example 1

Synthesis of Vinyl Benzyl Azide

To a 100 ml round bottom flask equipped with a stir bar, 4.0 g (26.2 mm) of vinylbenzyl chloride, and 10 ml of dimethyl-formamide (DMF) were added. To this solution 3.40 g (52.4 mm) of sodium azide was added and the reaction mixture was stirred at room temperature overnight, after which time 50 ml of deionized water were added to the solution. The resulting 4-vinyl benzyl azide was extracted from the reaction solution with ethyl ether. The product was confirmed by $^1$H NMR.

Example 2

Synthesis of Water Soluble Azido-Functional Polymer (P-1)

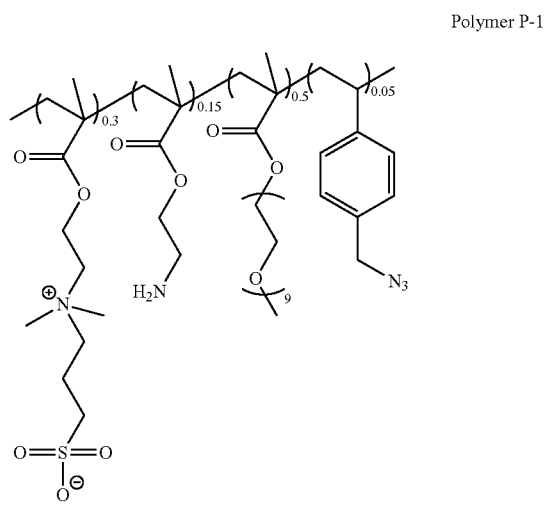

Polymer P-1

Figure 2:
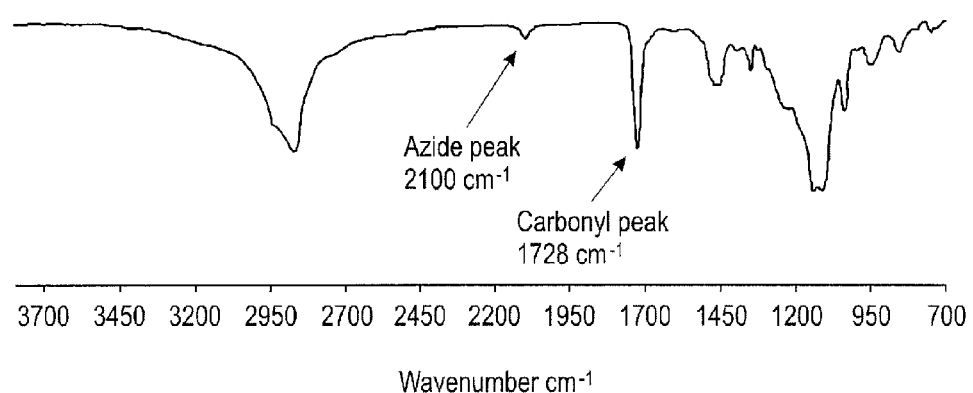
FIG. 2 is a FTIR spectrum of polymer P-1 of Example 2.

A water-soluble anti-fouling polymer was synthesized by free-radical polymerization. To a 250-ml three neck round bottom flask equipped with a magnetic stir bar and a condenser, 0.54 g (3.27 mmol) of 2-aminoethyl methacrylate hydrochloride salt (AEMA-HCl), 1.82 g (6.54 mmol) of sulfobetaine methacrylate (SBMA), 5.17 g (10.9 mmol) of polyethylene glycol methyl ether methacrylate (MPEGMA), Mn=475 g/mol (Mn=the number average molecular weight), 0.17 g (1.09 mmol) of 4-vinylbenzyl azide, 23 ml deionized water and 0.35 g (1.30 mmol) of 2,2azobis(2-methypropion-amidine) dihydrochloride (AMPA-2HCl) were added. The reaction mixture was evacuated and purged with three vacuum/nitrogen cycles, followed by stirring for 24 hours at 70° C. to obtain the hydrophilic polymer P-1 shown. A small aliquot of the polymer solution was taken from the reaction mixture and used for characterization of the polymer using $^1$H NMR and FTIR. The $^1$H NMR of the crude polymer showed more than 99% conversion of the vinyl groups. FTIR (FIG. 2) confirmed the presence of the azide group on the polymer backbone with a sharp peak at 2210 cm$^{-1}$.

The remaining polymer solution was diluted in deionized water to obtain a 2 wt. % solution. The polymer solution was filtered through a filter paper and then used to fabricate a coating layer on polysulfone UF membrane without further modification. The subscripts in the formula of P-1 indicate relative moles.

Example 3

Synthesis of Water Soluble Azido-Functional Polymer (P-2)

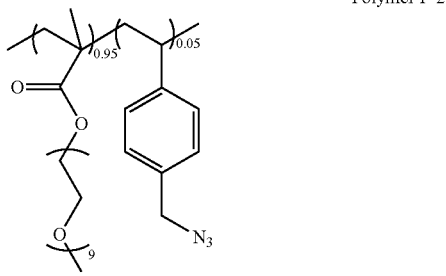

Polymer P-2

A water-soluble anti-fouling polymer was synthesized by free-radical polymerization. To a 250-ml three neck round bottom flask equipped with a magnetic stir bar and a condenser, 7.0 g (14.7 mmol) of polyethylene glycol methyl ether methacrylate (MPEGMA), Mn=475 g/mol (Mn=the number average molecular weight), 0.12 g (0.775 mmol) of 4-vinylbenzyl azide, 21 ml deionized water and 0.24 g (0.88 mmol) of 2,2azobis(2-methypropion-amidine) dihydrochloride (AMPA-2HCl) were added. The reaction mixture was evacuated and purged with three vacuum/nitrogen cycles, followed by stirring for 24 hours at 70° C. to obtain the hydrophilic polymer P-2. A small aliquot of the polymer solution was taken from the reaction mixture and used for characterization of the polymer using $^1$H NMR and FTIR. The $^1$H NMR of the crude polymer showed more than 99% conversion of the vinyl groups. FTIR confirmed the presence of the azide group on the polymer backbone with a sharp peak at 2210 cm$^{-1}$.

The remaining polymer solution was diluted in deionized water to obtain a 2 wt. % solution. The polymer solution was filtered through a filter paper and then used to fabricate a coating layer on polysulfone UF membrane without further modification. The subscripts in the formula of P-1 indicate relative moles.

Example 4

Photografting of P-1 on Polysulfone UF Membrane (M-1)

Figure 3:
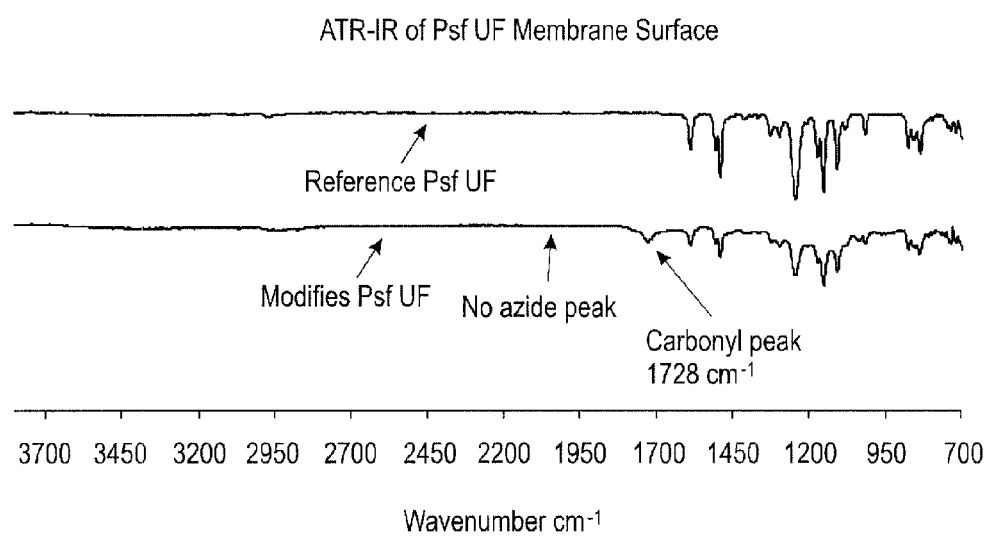
FIG. 3 shows the ATR-IR spectra of reference and modified UF membranes as described in Example 4 using polymer P-1 of Example 2.

50 ml of a 2 wt % solution of polymer P-1 (Example 2) was taken in a glass disc and a polysulfone UF membrane coupon (1 inch×1 inch) was dipped in the solution for two minutes. The membrane was then removed and excess solution was removed using a rubber roller. The resulting wet membrane was exposed to 254 nm UV light for 5 minutes. The membrane was characterized for surface grafting using ATR-IR (FIG. 3). The hydrophilicity of the modified membrane was also tested by water contact angle measurements.

Figure 4:
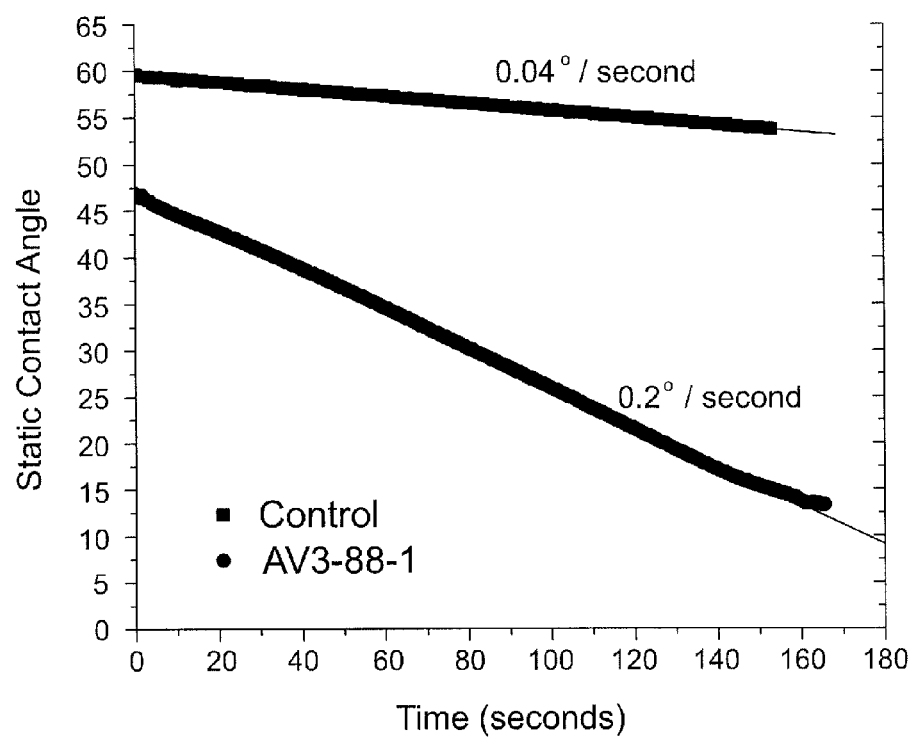
FIG. 4 is a plot of the static water contact angle of membranes as a function of time. The line designated AV3-88-1 is membrane M-1 of Example 4.

FIG. 4 shows the water contact angle of reference PSF and the UF M-1 membrane as a function of time. The water contact angle of the UF M-1 membrane after 150 sec was much lower than the reference membrane, which indicated that the modified membrane was very hydrophilic.

Example 5

To determine the fouling resistance of the modified membranes, bovine serum albumin (BSA) was used as a model foulant.

Membrane M-2 was fabricated using a 2 wt % solution of polymer P-2 (Example 3) using the procedure described in Example 4.

Irreversible protein fouling was determined by comparing the pure water permeance of modified and unmodified PSF membranes before and after a fouling experiment. Before a fouling experiment, the pure water flux ($P_{w,o}$) of the membranes was determined at 10 psi with dead-end filtration cells. The pure water flux for reference and M-2 membranes was 259 and 79 LMH, respectively.

A fouling experiment was then performed by adding bovine serum albumin (BSA) feed solution (0.2 g BSA and 20 mL of 0.1M phosphate buffer in 200 mL water) into the filtration cells. The water flux of the reference and M-2 membranes was obtained after 2 hours of fouling with the BSA solutions (157 and 76 LMH, respectively), and the membranes were further exposed to the BSA solution overnight. The membranes were then flushed with deionized (DI) water at least ten times, after which the filtration cells were stirred with DI water for 10 min to rinse the membrane surfaces. The post-fouling pure water flux ($P_{w,f}$) was recorded after finishing the rinsing cycles (157 and 76 LMH, respectively). The water flux recovery index was then calculated by dividing $P_{w,f}$ by $P_{w,o}$. The flux recovery of the reference and M-2 membranes after BSA fouling was 61% and 96%, indicating that the modified membrane M-2 had better fouling resistance than the reference membrane.

Various embodiments of the invention have been described. These and other embodiments are within the scope of the following claims.

The invention claimed is:

1. A method of photo-grafting onto a surface of a membrane a polymer selected from the group consisting of:

(A)

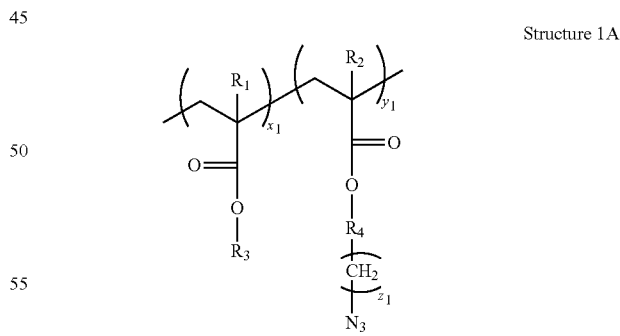

Structure 1A wherein, in Structure 1A:

$x_1 \geq 2$ and $y_1 \geq 1$;

$R_1$ and $R_2$ are independently selected from the group consisting of $CH_3$ and H;

$R_3$ is independently selected from the group consisting of poly(oxyalkylene), quaternary ammonium salts, pyridinium salts, sulfonium salts, sulfobetaines, carboxybetaines, alcohols, phenols, tertiary amines, aryl groups; linear, branched and cyclic alkylenes; linear, branched and cyclic heteroalkylenes; linear, branched and cyclic fluoroalkylenes; and siloxyl;

$R_4$ is independently selected from the group consisting of linear, branched, and cyclic alkylenes; linear, branched and cyclic hetroalkylenes; linear, branched and cyclic fluoroalkylenes; phenyl; and siloxyl; and $z_1$ is 0 or 1;

and;

(B)

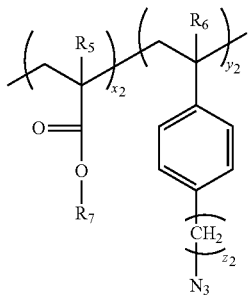

Structure 1B wherein, in Structure 1B:

$x_2 \geq 2$ and $y_2 \geq 1$;

$R_5$ and $R_6$ are independently selected from the group consisting of $CH_3$ and H;

$R_7$ is independently selected from the group consisting of poly(oxyalkylene), quaternary ammonium salts, pyridinium salts, sulfonium salts, sulfobetaines, carboxybetaines, alcohols, phenols, tertiary amines, aryl groups; linear, branched and cyclic alkylenes; linear, branched and cyclic heteroalkylenes; linear, branched and cyclic fluoroalkylenes; and siloxyl; and $z_2$ is 0 or 1.

2. The method of claim 1, comprising:
i) dipping the membrane into an aqueous solution comprising at least one of Structure 1A and 1B;
ii) removing excess aqueous solution from the surface of the membrane; and
iii) exposing the surface of the membrane to an actinic light source.

3. The method of claim 1, wherein the membrane is selected from the group consisting of polysulfone UF membranes, polacrylonitrile UF membranes, and PVDF UF membranes.

4. The method of claim 1, wherein the Structure 1B is represented by the following:

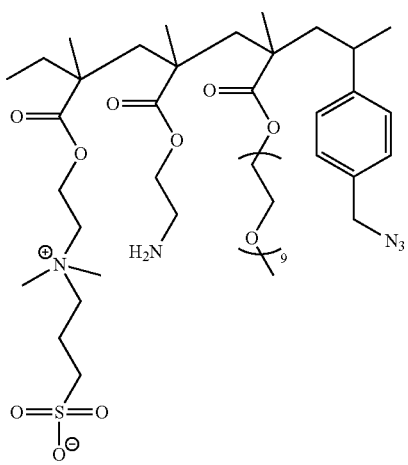

5. The method of claim 1, wherein the Structure 1B is represented by the following:

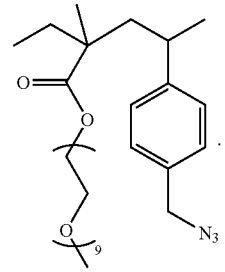

6. The method of claim 1, wherein the Structure 1A is represented by the following:

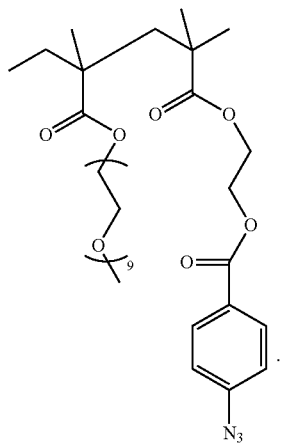

7. A method, comprising:
(a) applying to a surface of a membrane an aqueous solution comprising a polymer selected from the group consisting of:
(A)

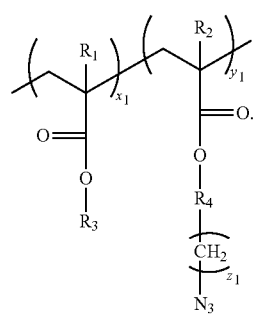

Structure 1A wherein, in Structure 1A:

$x_1 \geq 2$ and $y_1 \geq 1$;

$R_1$ and $R_2$ are independently selected from the group consisting of $CH_3$ and H;

$R_3$ is independently selected from the group consisting of poly(oxyalkylene), quaternary ammonium salts, pyridinium salts, sulfonium salts, sulfobetaines, carboxybetaines, alcohols, phenols, tertiary amines, aryl groups;

linear, branched and cyclic alkylenes; linear, branched and cyclic heteroalkylenes; linear, branched and cyclic fluoroalkylenes; and siloxyl;

$R_4$ is independently selected from the group consisting of linear, branched, and cyclic alkylenes; linear, branched and cyclic hetroalkylenes; linear, branched and cyclic fluoroalkylenes; phenyl; and siloxyl; and $z_1$ is 0 or 1;

and;

(B)

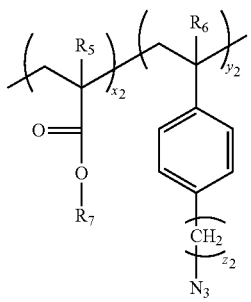

Structure 1B wherein, in Structure 1B:

$x_2 \geq 2$ and $y_2 \geq 1$;

$R_5$ and $R_6$ are independently selected from the group consisting of $CH_3$ and H;

$R_7$ is independently selected from the group consisting of poly(oxyalkylene), quaternary ammonium salts, pyridinium salts, sulfonium salts, sulfobetaines, carboxybetaines, alcohols, phenols, tertiary amines, aryl groups; linear, branched and cyclic alkylenes; linear, branched and cyclic heteroalkylenes; linear, branched and cyclic fluoroalkylenes; and siloxyl; and $z_2$ is 0 or 1; and (b) exposing the surface of the membrane to an actinic light source to graft at least one of the polymers to the surface of the membrane.

8. The method of claim 7, wherein the light source has an output wavelength of 254 nm.

9. The method of claim 7, wherein the membrane is dipped into the aqueous solution in step (a).

10. The method of claim 7, further comprising removing an excess of the aqueous solution from the surface of the membrane between steps (a) and (b).

11. The method of claim 7, further comprising removing unreacted polymer from the surface of the membrane following step (b).

12. The method of claim 11, wherein the unreacted polymer is removed by soaking the membrane in water.

13. The method of claim 7, wherein the aqueous solution comprises about 1% (w/v) to about 10% (w/v) of the polymer.

14. The method of claim 13, wherein the aqueous solution comprises about 2% (w/v) of the polymer.

15. The method of claim 7, wherein the membrane is selected from the group consisting of polysulfone UF membranes, polacrylonitrile UF membranes, and PVDF UF membranes.

* * * * *